M. MILLER.
COMBINATION BOILER AND STRAINER.
APPLICATION FILED FEB. 23, 1921.

1,428,388.

Patented Sept. 5, 1922.

INVENTOR
MARIE MILLER
BY Fetherstonhaugh & Co.
ATT'YS.

Patented Sept. 5, 1922.

1,428,388

UNITED STATES PATENT OFFICE.

MARIE MILLER, OF OTTAWA, ONTARIO, CANADA.

COMBINATION BOILER AND STRAINER.

Application filed February 23, 1921. Serial No. 447,190.

*To all whom it may concern:*

Be it known that I, MARIE MILLER, a subject of the King of Great Britain, a resident of the city of Ottawa, Province of Ontario, Dominion of Canada, have invented certain new and useful Improvements in Combination Boilers and Strainers, of which the following is a specification.

This invention relates to improvements in combination boilers and strainers, and the objects of the invention are to provide a boiler and strainer in which vegetables, such as potatoes, corn, etc., may be cooked, or in which meat may be boiled, and whereby the vegetables or meat may be removed from the liquid in the boiler and strained in a single operation, and to protect the hands of the person removing the strainer so that they will not be scalded by steam.

The invention consists essentially of the construction and arrangement of parts hereinafter described.

Figure 1:
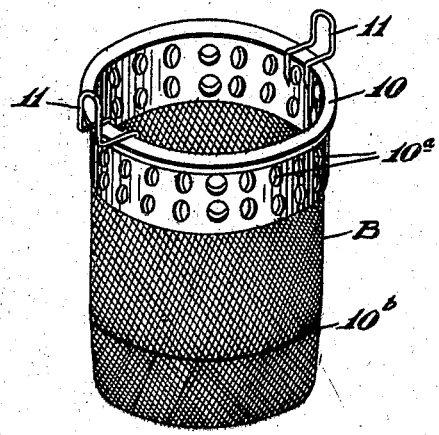
Figure 1 is a perspective view of the strainer.
Figures 2, 3, 4:
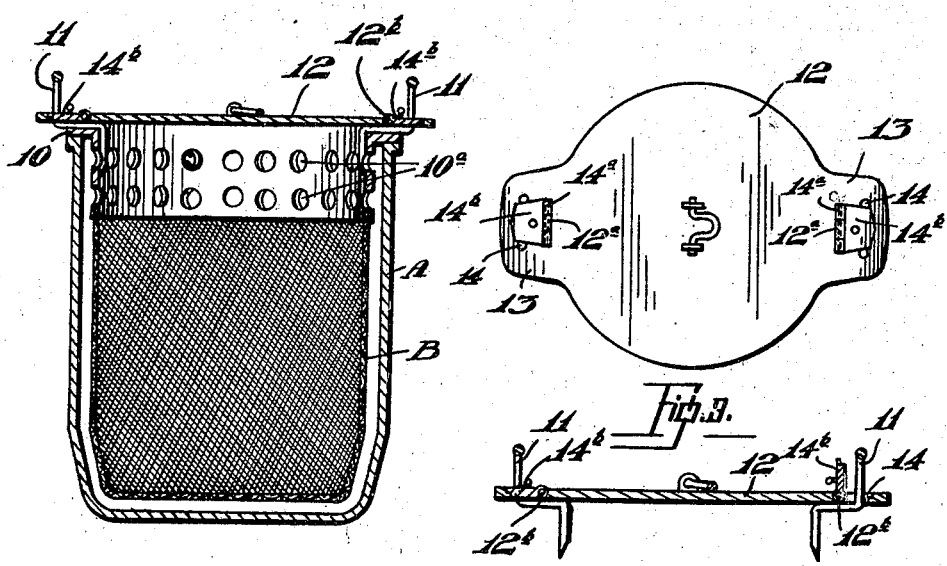
Figure 2 is a vertical section through the strainer and boiler.
Figure 3 is a plan view of the lid or cover.
Figure 4 is a longitudinal section through the lid or cover.

Referring to the drawings; A represents the boiler, and B the strainer, which fits within the boiler but provides a water space between the sides and bottom of the strainer and sides and bottom of the boiler.

The strainer B is formed at the upper end with an annular flange 10 which rests on the upper edge of the boiler A and a pair of hand grips 11 are provided by means of which the strainer may be lifted out with the boiler.

The strainer B is partly made of sheet metal provided with a plurality of apertures $10^a$ and partly of wire netting $10^b$ which forms the bottom and sides thereof. The lid or cover 12 has side wings 13 located diametrically opposite each other and formed with elongated orifices 14 through which the hand grips 11 pass.

The lid 12 is provided on the top face thereof adjacent the orifices 14 with projections $14^a$ bored transversely and a tongue $14^b$ having a rearward extension $12^a$ provided with a transverse bore adapted to register with the bore in the projections $14^a$ and engaged by a pin $12^b$.

After the hand grips 11 have been passed through the orifices 14, the tongues $14^b$ can be rotated on the pins $12^b$ and passing under the hand grips 11, close the orifices 14, thus leaving no opening for the vapour to come onto the hands of the person carrying the strainer.

When lifting the strainer B out of the boiler A, the lid or cover 12 remains in position on the strainer and is lifted therewith and serves as a protection to the hands so that the person lifting the strainer will not become burned or scorched.

When the strainer B is being removed from the boiler A the liquid drains through the wire netting into the boiler and the vegetables or meat in the strainer are then in the proper condition to be served.

When meat is being cooked the liquid in the boiler may be used for soups and if potatoes are being cooked the liquid in the boiler may be kept for bread making.

In this way it will be clear that a great saving is effected both of the vegetables or meat being cooked and also the liquid, while adequate protection against burns is given to the person using this type of cooking utensil.

As many changes could be made in the above construction and many widely different embodiments of my invention within the scope of the claim constructed without departing from the spirit or scope thereof, it is intended that all matter contained in the accompanying specification and drawings shall be interpreted as illustrative and not in a limiting sense.

What I claim as my invention is:

A cooking utensil of the character described formed with hand grips, a lid formed with side wings diametrically opposed to one another and having elongated orifices therein designed to receive said hand grips, tongues hingedly connected to the side wings adjacent to said orifices and designed to completely close said orifices after the hand grips have passed therethrough.

In witness whereof I have hereunto set my hand in the presence of two witnesses.

MRS. MARIE MILLER.

Witnesses:
W. B. MACCORMACK,
WM. M. HANLEY, Jr.